(12) United States Patent
Kemeny et al.

(10) Patent No.: US 6,701,393 B1
(45) Date of Patent: Mar. 2, 2004

(54) SYSTEMS AND METHODS FOR MANAGING STORAGE LOCATION DESCRIPTORS

(75) Inventors: John Kemeny, Westford, MA (US); Naizhong Qui, Newton, MA (US); Xueying Shen, Sturbridge, MA (US)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 10/185,814

(22) Filed: Jun. 27, 2002

(51) Int. Cl.[7] .................................................. G06F 3/00
(52) U.S. Cl. .............................. 710/40; 710/54; 710/55; 711/145; 711/208
(58) Field of Search .......................... 710/15, 36, 39, 710/40, 52, 54, 55, 65, 112; 712/225; 370/412; 711/100, 118, 129, 145, 208

(56) References Cited

U.S. PATENT DOCUMENTS

| | | | | |
|---|---|---|---|---|
| 3,675,209 A | * | 7/1972 | Trost et al. | 340/172.5 |
| 4,777,595 A | * | 10/1988 | Strecker et al. | 364/200 |
| 6,018,527 A | * | 1/2000 | Yin et al. | 370/412 |
| 6,041,060 A | * | 3/2000 | Leichty et al. | 370/412 |
| 6,067,300 A | * | 5/2000 | Baumert et al. | 709/223 |
| 6,195,682 B1 | * | 2/2001 | Ho et al. | 709/203 |
| 6,199,124 B1 | * | 3/2001 | Ramakrishnan et al. | 710/40 |

* cited by examiner

Primary Examiner—Rehana Perreen
Assistant Examiner—Rijue Mai
(74) Attorney, Agent, or Firm—Chapin & Huang, L.L.C.; David E. Huang, Esq.

(57) ABSTRACT

A device (e.g., a secondary cache device) manages descriptors which correspond to storage locations (e.g., cache blocks). The device includes memory and a control circuit coupled to the memory. The control circuit is configured to arrange the descriptors, which correspond to the storage locations, into multiple queues within the memory based on storage location access frequencies. The control circuit is further configured to determine whether an expiration timer for the particular descriptor has expired in response to a particular descriptor reaching a head of a particular queue. The control circuit is further configured to move the particular descriptor from the head of the particular queue to a different part of the multiple queues, wherein the different part is identified based on access frequency when the expiration timer for the particular descriptor has not expired, and not based on access frequency when the expiration timer for the particular descriptor has expired.

20 Claims, 5 Drawing Sheets

SYSTEMS AND METHODS FOR MANAGING STORAGE LOCATION DESCRIPTORS

BACKGROUND OF THE INVENTION

A typical data storage system includes a controller, an input/output (I/O) cache and a set of disk drives. The I/O cache temporarily stores data received from an external host for subsequent storage in the set of disk drives, as well as temporarily stores data read from the set of disk drives for subsequent transmission to an external host. In order to efficiently coordinate the use of space within the I/O cache, the controller manages descriptors which identify and describe the status of respective memory blocks (e.g., 512 byte segments) of the I/O cache.

Some conventional approaches to managing descriptors involve the use of a memory construct called a Least-Recently-Used (LRU) queue. In one conventional approach (hereinafter referred to as the single-queue approach), each descriptor (i) is an entry of an LRU queue, and (ii) resides at a location within the LRU queue based on when the memory block identified by that descriptor (i.e., by that LRU entry) was accessed (e.g., a lookup operation) relative to other the blocks identified by the other descriptors (i.e., by the other LRU entries). In particular, the descriptor at the tail (or beginning) of the LRU queue identifies the most recently accessed block of the I/O cache, the next descriptor identifies the next most recently accessed block, and so on. Accordingly, the descriptor at the head (or end) of the LRU queue identifies the least recently used block of the I/O cache.

During operation, the controller reuses descriptors from the head of the LRU queue in response to cache miss operations. In particular, when the controller needs to move non-cached data into the I/O cache due to a cache miss, the controller (i) moves the non-cached data into the memory block of the I/O cache identified by the descriptor at the head of the LRU queue (i.e., the least recently used block of the I/O cache), and (ii) moves the descriptor from the head to the tail of the LRU queue to indicate that the identified block is now the most recently used block of the I/O cache.

In response to a cache hit, the data already resides in a block of the I/O cache. Accordingly, the controller simply moves the descriptor identifying that block from its current location within the LRU queue (e.g., perhaps in the middle of the LRU queue) to the tail of the LRU queue to indicate that the identified block is now the most recently used block of the I/O cache.

Another conventional approach to managing descriptors uses multiple LRU queues. In this approach (hereinafter referred to as the multi-queue approach), each descriptor (i) identifies a memory block of the I/O cache, and (ii) includes a cache hit field which stores the absolute number of cache hits which have occurred on that block. A first LRU queue includes descriptors to I/O cache blocks having a minimal number of hits (e.g., one or two cache hits). Other queues include descriptors to I/O cache blocks having higher numbers of hits.

During operation, the controller responds to cache misses by (i) pulling descriptors from the head of the first LRU queue to identify the least recently used blocks of the I/O cache for caching new data, (ii) updating the contents of the cache hit fields of the descriptors and (iii) placing the descriptors at the tail of the first LRU queue. In response to cache hits on I/O cache blocks, the controller updates the contents of the cache hit fields of the descriptors identifying those blocks and moves those blocks to the tails of the LRU queues based on results of a queue priority function. Further details of how the multi-queue approach works will now be provided with reference to the following example.

Suppose that a particular multi-queue approach uses four LRU queues which are numbered "0", "1", "2" and "3" to correspond to results of a queue priority function as will now be explained in further detail. In response to a cache miss operation, the controller (i) pulls a descriptor from the head of the first LRU queue, (ii) writes the non-cached data to the block identified by that descriptor, (iii) initializes the contents of a cache hit field of that descriptor to "1", and (iv) pushes that descriptor onto the tail of the first LRU queue. Since that descriptor is no longer at the head of the first LRU queue, that descriptor no longer identifies the least recently used block of the I/O cache.

After the passage of time and/or the occurrence of other I/O cache operations, the location of that descriptor within the first LRU queue may shift (e.g., that descriptor may migrate to the middle of the first LRU queue due to other descriptors being added to the tail of the first LRU queue in response to caching operations). In response to a subsequent cache hit on the block identified by that descriptor, the controller (i) increments the contents of the cache hit field of that descriptor, (ii) performs a queue priority function on the incremented contents to provide a queue priority function result, and moves that descriptor to a new location based on the queue priority function result. For example, suppose that the contents of the cache hit field of that descriptor is still "1" and that the queue priority function is $\log_2$("contents of the cache hit field"). In response to a cache hit on the block identified by that descriptor, the controller increments the contents of the cache hit field from "1" to "2" (indicating that there has now been one additional cache hit that has occurred on the block identified by that descriptor), generates a queue priority function result (e.g., $\log_2(1)$ is "0"), and moves the descriptor to a new location of the multiple queues (e.g., from the middle of the first LRU queue to the tail of the first LRU queue) based on the queue priority function result.

It should be understood that, over time, the contents of the cache hit fields of the descriptors can increase to the point in which the queue priority function results direct the controller to move the descriptors to the tails of LRU queues other than the first LRU queue. For instance, if the incremented contents of a descriptor equals two, the result of the queue priority function is "1" (e.g., $\log_2(2)$ is "1"), and the controller moves that descriptor from the first LRU queue to the second LRU queue. Similarly, while a descriptor resides in the second LRU queue, if the number of cache hits reaches the next $\log_2$ barrier (i.e., four), the controller moves that descriptor from the second LRU queue to a third LRU queue, and so on. Accordingly, in the multi-queue approach, the controller is configured to promote descriptors from each LRU queue to an adjacent higher-level LRU queue based on increases in the number of hits on the block identified by that descriptor.

It should be understood that the controller is also configured to demote descriptors from each LRU queue to an adjacent lower-level LRU queue as the descriptors reach the heads of that LRU queue and a lifetime timer expires. For example, when a descriptor reaches the head of the third LRU queue, the controller demotes that descriptor to the tail of the next lowest LRU queue, i.e., the tail of the second LRU queue. Similarly, when a descriptor reaches the head of the second LRU queue, the controller demotes that descriptor to the tail of the first LRU queue. Finally, as mentioned earlier, the controller reuses the descriptors at the head of the first LRU queue, which identify the least recently used blocks of the I/O cache, in response to cache misses.

In both the single-queue and multi-queue approaches, the descriptors within the LRU queues are typically arranged as doubly-linked lists. That is, each descriptor includes a forward pointer which points to the adjacent preceding descriptor in an LRU queue, and a reverse pointer which points to the adjacent succeeding descriptor in the LRU queue. When the controller moves a descriptor from the middle of an LRU queue to the tail of the same LRU queue or a new LRU queue, the controller performs multiple linked list operations. These linked list operations will now be described in further detail.

Suppose that the controller must move a particular descriptor from the middle of an LRU queue to the tail of the LRU queue (e.g., in response to a cache hit operation). First, the controller identifies the adjacent preceding descriptor and the adjacent succeeding descriptor by reading forward and reverse pointers of the particular descriptor. Second, the controller removes the particular descriptor from the LRU queue by (i) reading, modifying and storing the forward pointer of the adjacent preceding descriptor and (ii) reading, modifying and storing the reverse pointer of the adjacent succeeding descriptor. Third, the controller finds the first or tail descriptor in the LRU queue by reading a tail pointer of the LRU queue. Next, the controller adds the particular descriptor to the tail of the LRU queue by reading, modifying and storing the reverse pointer of first descriptor, and modifying and storing the forward and reverse pointers of the particular descriptor (the reverse pointer of the particular descriptor can be set to NULL or set to point to the particular descriptor itself since it is now the tail entry). Finally, the controller indicates that the particular descriptor is now at the tail of the LRU queue for a subsequent LRU access operation by modifying the tail pointer of the LRU queue.

SUMMARY OF THE INVENTION

Unfortunately, there are deficiencies to the above-described conventional approaches to managing descriptors using LRU queues. For example, in the both of the above-described conventional single-queue and multi-queue approaches, a substantial number of linked list operations are required when moving a descriptor from the middle of an LRU queue to a new location. For instance, when a controller of a data storage system moves a descriptor from the middle of an LRU queue to the tail of the LRU queue, there can be as many as 10 operations. In particular, there is usually one operation for reading the forward and reverse pointers of the particular descriptor to be moved in order to identify the adjacent preceding and adjacent succeeding descriptors, two operations for reading the adjacent preceding descriptor and setting its forward pointer to point to the adjacent succeeding descriptor, two operations for reading the adjacent succeeding descriptor and setting its reverse pointer to point to the adjacent preceding descriptor, one operation for reading the tail pointer to find the tail of the LRU queue, two operations for reading the old tail descriptor and setting the reverse pointer of the old tail descriptor to point to the particular descriptor, one operation for setting the forward and reverse pointers of the particular descriptor (the forward pointer pointing to the old tail descriptor, and the reverse pointer set to NULL or pointed to the particular descriptor itself), and one operation for setting the tail pointer to point to the particular descriptor.

While the controller of the data storage system moves the descriptor from the middle to the tail of the LRU queue, the controller typically locks the entire LRU queue to prevent another process from modifying the LRU queue (and perhaps corrupting the operation of the controller) until the controller is done. Accordingly, such operations can block other processes in the critical path from executing and pose a resource bottleneck to the data storage system. As a result, data storage systems which use the above-described conventional approaches are susceptible to performance drawbacks when placed in situations requiring large amounts of LRU queue modification.

In contrast to the above-described conventional approaches to managing descriptors using LRU queues, the invention is directed to techniques for managing descriptors which involve the moving descriptors from the heads of multiple queues based on access frequency and expiration timers. Such operation provides approximate LRU functionality while (i) alleviating the need for moving descriptors from the middles of LRU queues, and (ii) avoiding the above-described resource bottlenecking deficiencies (e.g., the high number of operations) associated with moving descriptors from the middle of LRU queues.

One embodiment of the invention is directed to a device (e.g., a control module for a data storage system, a secondary cache device, a general purpose computer, etc.) for managing descriptors which correspond to storage locations (e.g., cache blocks). The device includes memory and a control circuit coupled to the memory. The control circuit is configured to arrange the descriptors, which correspond to the storage locations, into multiple queues within the memory based on storage location access frequencies (e.g., based on results of a queue priority function). The control circuit is further configured to determine whether an expiration timer for the particular descriptor has expired in response to a particular descriptor reaching a head of a particular queue. The control circuit is further configured to move the particular descriptor from the head of the particular queue to a different part of the multiple queues, wherein the different part is identified based on access frequency when the expiration timer for the particular descriptor has not expired (e.g., to the tail of queue based on a queue priority function), and not based on access frequency when the expiration timer for the particular descriptor has expired (e.g., automatically to the tail of the adjacent lower level queue).

With this operation, the storage locations corresponding to the descriptors nearer the heads of the queues tend to be less recently used than the storage locations corresponding to the descriptors nearer the tails of the queues thus approximating the functionality of conventional descriptor management approaches which use LRU queues. However, by removing descriptors from the heads of the queues, the device alleviates the need to remove descriptors from middles of the queues thus avoiding the associated high number of linked list operations which characterize conventional approaches that remove descriptors from the middles of LRU queues. Rather, less operations are performed when simply moving descriptors from the heads of queues expire to the tails of queues (e.g., to the tail of the adjacent lower queue when the expiration timers of the descriptors have expired, and to a tail of a queue based on a queue priority function when the expiration timers of the descriptors have not expired) to achieve approximate LRU functionality. Moreover, experimental studies have shown that the performance of the invention techniques provide similar effectiveness in optimizing cache use (e.g., to avoid cache misses) but at significantly less overhead.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for managing storage location descriptors which involve moving the descriptors from the heads of multiple queues based on access frequency and whether expiration timers have expired. Such operation provides approximate Least-Recently-Used (LRU) functionality while (i) alleviating the need for moving the descriptors from the middles of LRU queues as in conventional descriptor management approaches, and (ii) avoiding resource bottlenecking deficiencies associated with moving descriptors from the middle of LRU queues.

Figure 1:
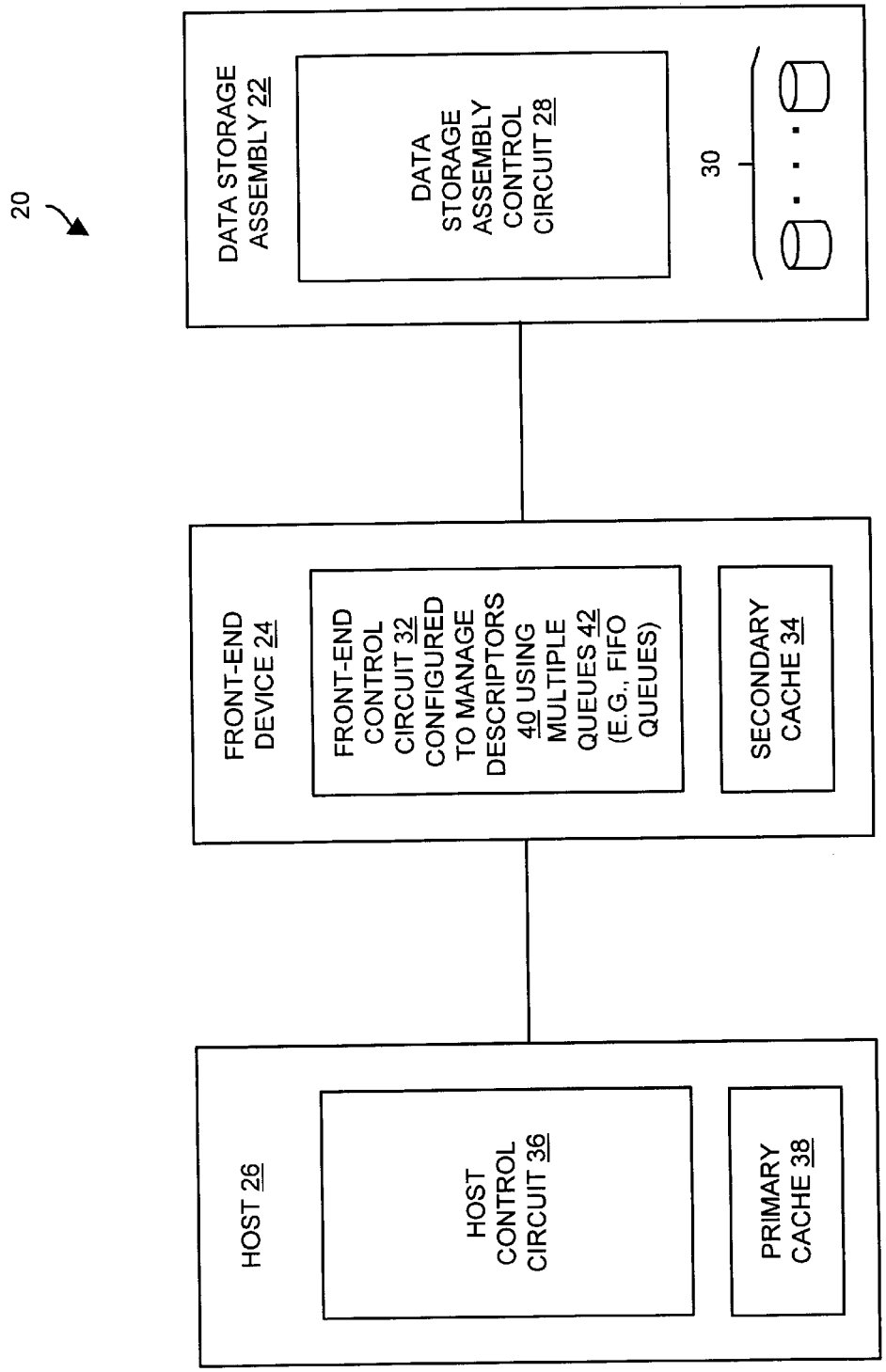
FIG. 1 shows a block diagram of a data storage system configuration which is suitable for use by the invention.

FIG. 1 shows a data storage system configuration 20 which is suitable for use by the invention. The data storage system configuration 20 includes a data storage assembly 22, a front-end device 24 and a host 26. The data storage assembly 22 includes a data storage assembly control circuit 28 and a set of storage devices 30 (e.g., disk drives). The front-end device 24 includes a front-end control circuit 32 and a secondary cache 34. The host 26 includes a host control circuit 36 and a primary cache 38. The front-end control circuit 32 of the front-end device 24 is configured to manage descriptors 40 which identify portions of the secondary cache 34 using multiple queues 42, e.g., doubly-linked lists of descriptors arranged as logical first-in/first-out (FIFO) queues.

During operation of the data storage system configuration 20, the data storage assembly 22 stores and retrieves data on behalf of the host 26. For example, suppose that the host 26 requires access to some data stored on the set of storage devices 30 of the data storage assembly 22. The host 26 can obtain the data by sending a request to the data storage assembly 22 through the front-end device 24. The data storage assembly control circuit 28 responds by retrieving the data from the set of storage devices 30 and providing the data to the front-end device 24. The front-end device control circuit 32 stores the data, at least temporarily, in the secondary cache 34, and transmits the data to the host 26. As will be explained in further detail below, the front-end device 24 operates as a secondary caching device and utilizes an efficient multi-queuing scheme using the multiple FIFO queues 42 in order to reduce overhead but manage storage location descriptors 40 in an approximate LRU manner for good caching results. The host control circuit 36 of the host 26 then caches the data in the primary cache 38.

If the host 26 needs to re-access the data, the host 26 does not need to re-read the data from the data storage assembly 22. Rather, the host control circuit 36 can simply access the copied data residing within the primary cache 38. Accordingly, the host 26 can avoid incurring the communication latencies and the overhead associated with re-reading the same data from the data storage assembly 22.

If the host 26 modifies the data, the host control circuit 36 modifies the copy of the data in the primary cache 38. Additionally, the host control circuit 36 performs synchronization operations (e.g., at the same time it updates the primary cache, periodically, etc.) to update the copy of the data residing in the data storage assembly 22. During data synchronization, the host control circuit 36 sends the modified data back to the data storage assembly 22 through the front-end device 24. If the front-end device 24 still maintains a copy of the data in the secondary cache 34, the front-end device control circuit 32 can update its copy of the data as it sends the modified data onto the data storage assembly 22.

It should be understood that memory spaces within the caches 38, 34 are resources which may be re-consumed for other operations (e.g., reused or recycled over time). Accordingly, the host 26 may encounter a situation in which it needs to re-access the data but when it no longer has a copy of the data within the primary cache 38. In such situations, the host 26 must send a request for the data back to the data storage assembly 22 through the front-end device 24. If the front-end control circuit 32 determines that a copy of the data still resides in the secondary cache 34, the front-end control circuit 32 can fulfill the request without burdening the data storage assembly 22 and incurring the associated latencies of communicating with the data storage assembly 22. Rather, the front-end control circuit 32 can simply read the data out of the secondary cache 34 and provide that data to the host 26.

The front-end device 24 uses descriptors 40 which correspond to storage locations within the secondary cache 34. In particular, the front-end control circuit 32 manages descriptors 40 which identify blocks (e.g., contiguous 512-byte segments) of the secondary cache 34. To this end, the front-end device 24 arranges the descriptors into the multiple queues 42 with approximate LRU multi-queue functionality. That is, the descriptors 40 toward the tails of each queue 42 tend to be more recently used, and the descriptors 40 toward the heads of each queue 42 tend to be less recently used. Each queue 42 is a doubly-linked list of descriptors 40 which the front-end control circuit 32 operates in a logical FIFO manner. Further details of the invention will now be provided with reference to FIG. 2.

Figure 2:
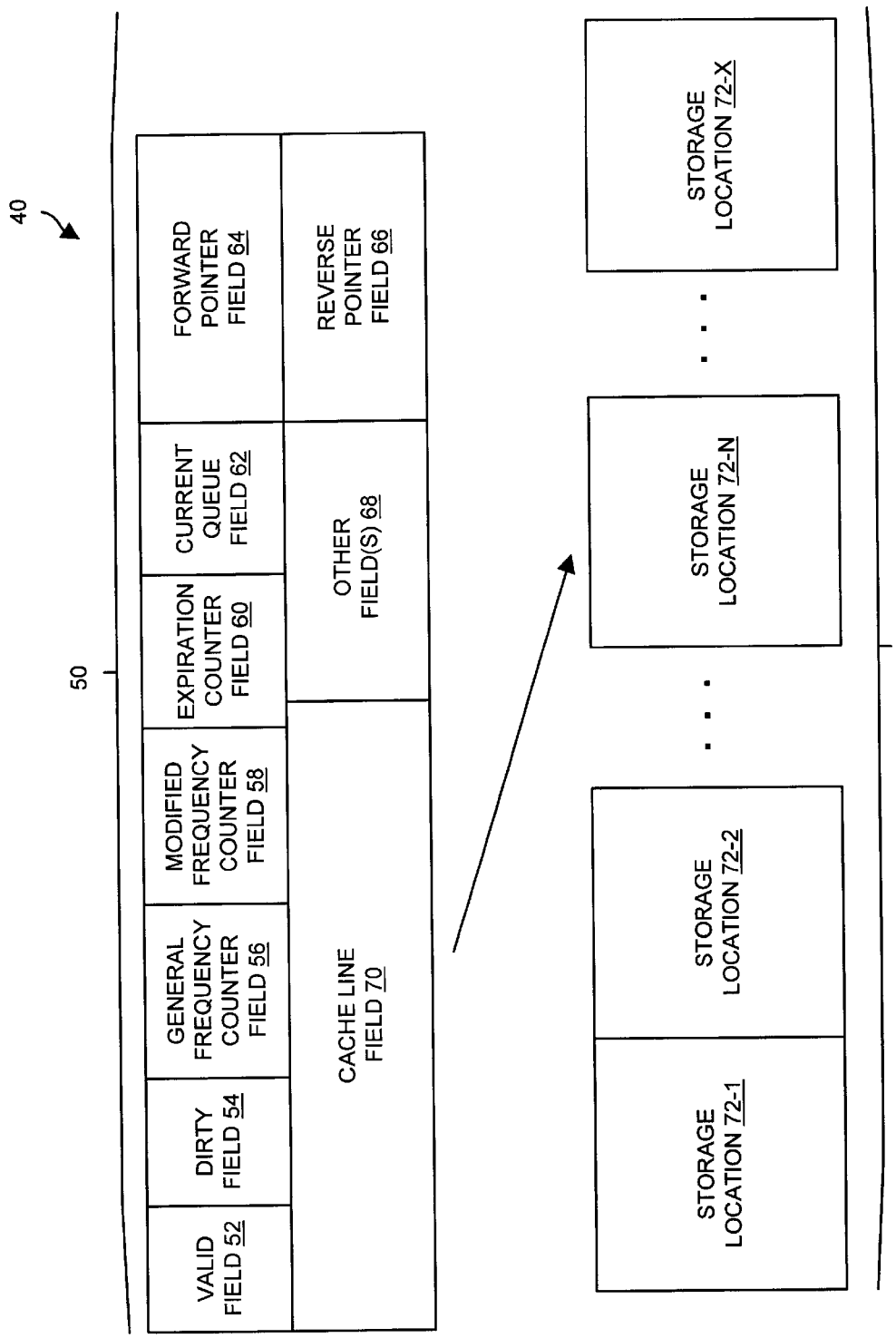
FIG. 2 shows a format for a descriptor which is suitable for use by the data storage system configuration of FIG. 1.

FIG. 2 shows a format 50 for a descriptor 40 which is suitable for use by the front-end device 24 of FIG. 1. It should be understood that the particular arrangement of fields within the descriptor format 50 can take a variety of orders, and that the field order presented in FIG. 2 is simply by way of example only.

As shown in FIG. 2, the format 50 for a descriptor 40 includes a valid field 52, a dirty field 54, a general frequency counter field 56, a modified frequency counter field 58 (used only in certain embodiments of the invention), an expiration counter field 60, a current queue field 62, a forward pointer field 64, a reverse pointer field 66, other fields 68 and a cache line field 70. The contents of the valid field 52 of a descriptor 40 indicate whether the storage location (e.g., the secondary cache block) identified by that descriptor 40 includes valid data. The contents of the dirty field 54 indicate whether the storage location identified by that descriptor 40 includes dirty data, i.e., data that must be synchronized to the data storage assembly 22. The contents of the general frequency counter field 56 indicates an absolute number of cache hits encountered by the front-end device 24 for the storage location identified by that descriptor 40. The contents of the modified frequency counter field 58 indicates a relative number of cache hits encountered by the front-end device 24 for the storage location identified by that descriptor 40. The contents of the expiration counter field 60 indicate a time at which the descriptor 40 will be ready for removal from a queue. The contents of the current queue field 62 identify the particular queue 42 of the multiple queues 42 to which the descriptor 40 belongs.

The contents of the forward pointer field 64 enable the descriptor 40 to point to another descriptor 40 in the forward direction. Similarly, the contents of the reverse pointer field 66 enable the descriptor to point to another descriptor 40 in the reverse direction. As will be explained later, the use of such pointers enables the descriptors 40 to reside in more-complex data structures such as doubly-linked lists.

It should be understood that the descriptor format 50 includes other fields 68 as well. For example, the descriptor format 50 can include an error detection or error correction field. The contents of the cache line 70 identify a particular area of the secondary cache 34 (also see FIG. 1).

Also shown in FIG. 2 are storage locations 72 (e.g., blocks) of the secondary cache 34 of the front-end device 24. By way of example only, the contents of the cache line field 70 of the descriptor 40 of FIG. 2 identify the storage location 72-N of the secondary cache 34. Other descriptors 40 within the multiple queues 42 identify other storage locations 72 of the secondary cache 34. Further details of the invention will now be provided with reference to FIG. 3.

Figure 3:
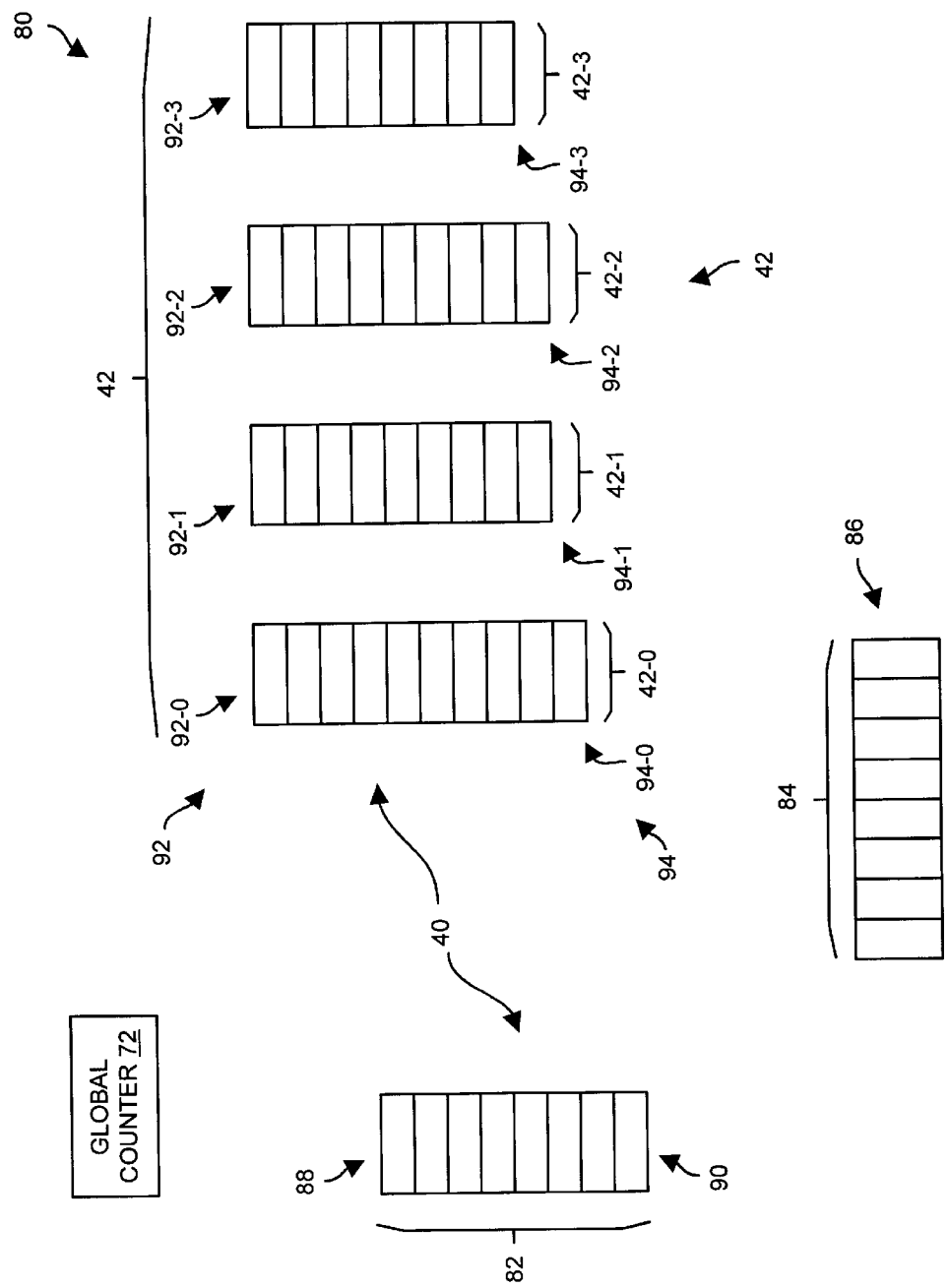
FIG. 3 shows, by way of example only, an arrangement of descriptors into four queues which are suitable for use by the data storage system configuration of FIG. 1.

FIG. 3 shows, by way of example only, an arrangement 80 of descriptors 40 having four queues 42-0, 42-1, 42-2 and 42-3 (collectively, queues 42) which is suitable for use by the invention. The arrangement 80 resides within the front-end control circuit 32 of the front-end device 24, and is used by the front-end control circuit 32 to control the use of the secondary cache 34.

As shown in FIG. 3, the arrangement 80 further includes a queue 82 of free descriptors 40 and a history queue 84 having a series of entries 86. The history queue entries 86 store the number of cache hits for data previously stored in the storage locations 72 (see FIG. 2) identified by the descriptors 40 in the free descriptor queue 82 so that such information is not lost if the storage locations 72 are reused to store new data, and then subsequently reused to store data previously cached in the secondary cache 34.

As further shown in FIG. 3, the free descriptor queue 82 includes a head 88 (i.e., a descriptor 40 at the end of the free descriptor queue 72) and a tail 90 (i.e., a descriptor 40 at the beginning of the free descriptor queue 82). Similarly, each queue 42 includes a head 92 and a tail 94. For example, the queue 42-0 includes a head 92-0 and a tail 94-0, the queue 42-1 includes a head 92-1 and a tail 94-1, and so on.

By way of example only, the queues 42, 82 are configured as linked list data structures within memory of the front-end control circuit 32 (FIG. 1). That is, the descriptors 40 of the free descriptor queue 82 are constructed and arranged such that each descriptor 40 includes a forward pointer that points to the next adjacent descriptor 40 in the forward direction, and a reverse pointer that points to the next adjacent descriptor 40 in the reverse direction (see the forward and reverse pointer fields 64, 66 of FIG. 2). The descriptors 40 toward the head 92 of each queue 42 tend to be less recently used that the descriptors 40 toward the tail 94. Accordingly, approximate LRU multi-queue functionality is achieved using the queues 42.

As mentioned earlier, the front-end control circuit 32 (FIG. 1) moves descriptors 40 through each queue 42 in a first-in/first-out (FIFO) manner, and there is no need to remove descriptors 40 from the middles of the queues 42. Accordingly, the front-end control circuit 32 does not need to perform an extensive number of linked-list operations as is common in conventional approaches to managing descriptors in LRU queues. Rather, during normal operation, the front-end control circuit 32 can simply remove descriptors 40 from the heads of the queues 42, 82 and add descriptors 40 to the tails of the queues 42, 82.

As further shown in FIG. 3, the arrangement 80 operates based on a global counter 96 which increments in response to each operation which moves a descriptor 40 within the arrangement 80. For instance, when the front-end control circuit 32 moves a descriptor 40 from the free descriptor queue 82 to one of the queues 42, the global counter 96 increments. Further details of the invention will now be provided with reference to FIG. 4.

Figure 4:
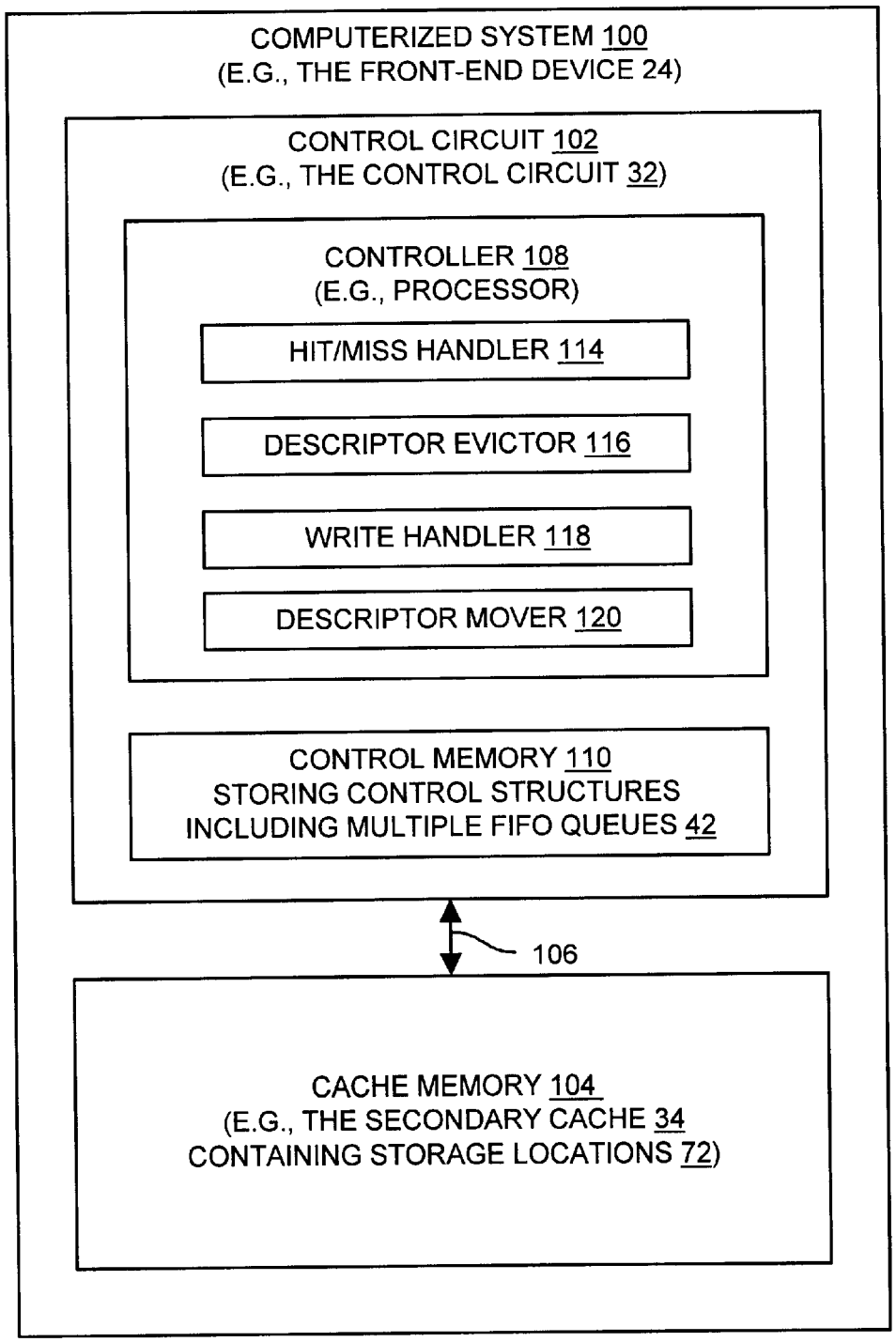
FIG. 4 shows a block diagram of a computerized system of the data storage system configuration of FIG. 1.

FIG. 4 shows a computerized system 100 which is suitable for use as the front-end device 24 of the data storage system configuration 20 of FIG. 1. After an overview of the various components of the computerized system 100 is provided, an explanation of how particular modules operate to manage the descriptors 40 within the multiple FIFO queues 42 in order to achieve approximate LRU performance will be provided.

As shown in FIG. 4, the computerized system 100 includes a control circuit 102, a cache memory 104 and an interconnection mechanism 106 which connects the control circuit 102 and the cache memory 104 (e.g., a computer bus). The control circuit 102 includes a controller 108 and control memory 110.

In one arrangement, the controller 108 is a processor which executes an application which configures the processor's operation. In particular, the application installs into the computerized system 100 from a computer program product 112 (e.g., from a set of CDROMs, tapes, diskettes, or the like, from a network download or propagated signal, etc.).

When the computerized system 100 operates as the front-end device 24 of the data storage system configuration 20 of FIG. 1, the control circuit 102 of the computerized system 100 is the control circuit 32 (also see FIG. 1), and the cache memory 104 is the secondary cache 34 which includes the storage locations 72 (also see FIGS. 1 and 2).

As shown in FIG. 4, the controller 108 includes a hit/miss handler module 114, a descriptor evictor module 116, a write handler module 118 and a descriptor mover 120. In one arrangement, these modules 114, 116, 118 and 120 are implemented as processes or threads which individually run within the controller 108 in a cooperative manner.

In general, the hit/miss handler module 114 is the main process or thread, and updates access frequencies and expiration timers of the descriptors of FIG. 3 in response to cache hits and cache misses. The descriptor evictor module 116 is a process or thread which creates free descriptors 40 identifying memory space of the cache memory 104 that is free to store data (i.e., storage locations 72 of the secondary cache 34 that are free to store data, see FIG. 1). The write handler module 118 is a process or thread which initiates write operations that synchronize data within the cache memory 104 to other storage (e.g., to non-volatile storage within the data storage assembly 22). The descriptor mover module 120 is a process or thread which moves descriptors 40 from the heads 92 of the queues 42 to new locations. In one arrangement, the modules 114, 116, 118 and 120 share access to the resource arrangement 80 of FIG. 3 in a multiplexed manner (e.g., prioritized context switching). The operation of each module 114, 116, 118 and 120 will now be described in further detail with reference to FIGS. 1 through 4.

The Hit/Miss Handler

In general, the hit/miss handler module 114 (or simply hit/miss handler 114) updates the arrangement 80 of FIG. 3 in response to cache hit and cache miss operations on the cache memory 104. Accordingly, when the computerized system 100 operates as the front-end device 24 of the data storage system configuration 20 of FIG. 1, the hit/miss handler 114 updates the arrangement 80 based on cache hits and cache misses of the secondary cache 34.

In particular, in response to an operation which accesses the cache memory 104 (i.e., a cache hit or a cache miss operation), the hit/miss handler 114 increments the global counter 96 (see FIG. 3). If the access is a cache miss, the hit/miss handler 114 obtains a descriptor 40 from the head 88 of the free descriptor queue 82 and loads the data into the storage location 72 identified by that descriptor 40. If the access is a cache hit, the data already resides in a storage location 72.

Next, the hit/miss handler 114 updates the contents of general frequency counter field 56 of the descriptor 40 (see the descriptor format 50 of FIG. 2). In particular, if the access is a cache hit, the hit/miss handler 114 increments the contents of the general frequency counter field 56. However, if the access is a cache miss and no entry 86 exists for the data in the history queue 84 (e.g., the data has never been cache), the hit/miss handler 114 initializes the contents of the general frequency counter field 56 to an initial value (e.g., "1"). If the access is a cache miss and an entry 86 exists for the data in the history queue 84 (e.g., the data had been previously cached within the cache memory 104 but then overwritten with other data), the hit/miss handler 114 sets the contents of the general frequency counter field 56 to its previous value which was stored in the entry 86 of the history queue 84.

Then, the hit/miss handler 114 sets the contents, $C_X$, of the expiration counter field 60. In particular, the hit/miss handler 114 stores the sum of the contents, $C_G$, of the global counter 96 and a lifetime constant $C_L$. That is, $C_X=C_G+C_L$. Accordingly, the hit/miss handler 114 updates access frequencies and expiration timers for the descriptors 40 in an ongoing manner.

The Descriptor Evictor

The descriptor evictor module 116 (or simply descriptor evictor 116) generates free descriptors 40 for the free descriptor queue 82. In particular, the computerized system 100 stores a low watermark value $F_{LWM}$. When the number of descriptors 40 within the free descriptor queue 82 drops below this low watermark value $F_{LWM}$, the descriptor evictor 116 (i) unlinks a descriptor 40 from the head 92 of the lowest non-empty queue 42 (e.g., the head 92-0 of the FIFO queue 42-0 in FIG. 3), (ii) invalidates the cache line of that descriptor 40 (i.e., sets the contents of the valid field 62 to indicate that the cache line contents are invalid), and (iii) pushes that descriptor 40 onto the tail 90 of the free descriptor queue 82. Thus, the descriptor evictor 116 keeps a healthy number of descriptors 40 available for use in the event that new data must be cached within the cache memory 104.

Additionally, the descriptor evictor 116 is responsible for updating the history queue 84. In particular, the descriptor evictor 116 stores the contents $C_F$ of the general frequency counter fields 56 of descriptors 40 moved onto the free descriptor queue 82 within entries 86 of the history queue 84 (e.g., a stack) in the event that the data is re-accessed at later times.

The Write Handler

The write handler module 118 (or simply write handler 118) initiates writes from the cache memory 104 to synchronize the data within the cache memory 104 with other memory (e.g., disk memory within the computerized system 100, memory within the data storage assembly 22, etc.). In particular, if the cache access operation is a write operation (e.g., an operation which modifies the data), the write handler 118 places a write request on the tail of a write queue for subsequent processing.

Furthermore, the write handler 118 is responsible for making sure that synchronization operations are attended to in an organized and efficient manner. Accordingly, if the number of requests within the write queue exceed a high watermark value $W_{LWM}$, the write handler 118 performs write operations in response to requests at the head of the write queue to reduce the number of pending write requests. In particular, the write handler 118 identifies storage locations 72 to be synchronized based on descriptors 40 corresponding to requests at the head of the write queue, synchronizes the data in those storage locations 72, and changes the contents of the dirty fields 54 of those descriptors 40 to indicate that the storage locations are now clean (i.e., changes their status from dirty to clean).

Descriptor Mover

The descriptor mover module 120 (or simply descriptor mover 120) is responsible for moving descriptors 40 from the heads 92 of the FIFO queues 42 to the tails of the FIFO queues 42. These tasks which move descriptors 40 from the queue heads 92 require fewer operations than conventional tasks which move conventional descriptors from the middles of queues. Accordingly, the invention requires less overhead to move descriptors.

The descriptor mover 120 is configured to move descriptors 40 from the queue heads 92 in different manners depending on whether the expiration timers have expired, i.e., when the contents of the expiration counter fields of the head descriptors 40 exceed the current contents of the global counter 96. That is, for the descriptor 40 at the head 92 of each FIFO queue 42, the descriptor mover 120 examines the contents of the expiration counter field 60 of that descriptor 40 to determine whether the counter for that descriptor 40 has expired (i.e., whether the contents exceed the current contents of the global counter 96).

If the expiration counter for that descriptor 40 has expired, the descriptor mover 120 moves that descriptor 40 to the next lower FIFO queue 42 (based on the contents of the current queue field 62) and updates the contents of the current queue field 62 of that descriptor 40 to reflect the move.

However, if the expiration counter for that descriptor 40 has not expired, the descriptor move 120 selects one of the multiple FIFO queues 42 based on access frequency. In particular, the descriptor mover 120 applies a queue priority function (e.g., log2( )) to the contents, $C_F$, of the general frequency counter field 58 of that descriptor 40 to generate a queue priority function result. The descriptor mover 120 then moves that descriptor 40 to the tail 94 of a queue 42 based on the queue priority function result, and updates the contents of the current queue field 62 based on that result. For example, if the result is "0" (for only one hit), the descriptor mover 120 moves the descriptor 40 onto the tail 94-0 of the first FIFO queue 42-0. If the result is "1" (for two or three hits), the hit/miss handler 114 moves the descriptor 40 onto the tail 94-1 of the second FIFO queue 42-1, and so on.

Based on a review of the above-described operation of the descriptor mover 120, it should be clear that the descriptor mover 120 moves descriptors 40 onto the FIFO queues 42 based on the particular power of 2, in this example, of the cache hit frequency of the cached data. That is, for a descriptor from a particular queue 42-N, if the updated frequency $C_F$ crosses a power of 2, the descriptor 40 is essentially promoted to the next higher queue 42-(N+1).

For example, suppose that the hit/miss handler 114 initially placed a particular descriptor 40 at the tail 94-2 of the FIFO queue 42-2 and set the contents of the expiration counter field 60 of that descriptor to equal the sum of the current global counter $C_G$ and the lifetime constant $C_L$. Additionally, the hit/miss handler 114 sets the contents of the current queue field 62 for that descriptor 40 to identify the queue 42-2 as the current queue.

During subsequent operation, the descriptor 40 moves toward the head 92-2 of the queue 42-2. In particular, other descriptors 40 of the queue 42-2 are removed from the head 92-2 by the descriptor mover 120, and other descriptors 40 are added to the tail 92-2 by the hit/miss handler 114. When the descriptor 40 finally reaches the head 92-2 of the queue 42-2, the descriptor mover 120 looks at the contents of the expiration counter field 60 of the descriptor 40. If the expiration timer of that descriptor 40 has expired (i.e., if the contents of the global counter 96 exceed the contents of the expiration counter field 60), the descriptor mover 120 simply moves the descriptor 40 to the tail of the adjacent lower queue 42, i.e., the tail 94-1 of the queue 42-1. However, if the expiration timer of that descriptor 40 has not expired, the descriptor mover 120 performs the queue priority function on the access frequency of the storage location 72 associated with that descriptor 40, and moves the descriptor 40 to the tail 94 of a queue 42 based on the result of the queue priority function.

It should be understood that, since the descriptor mover 120 removes descriptors 40 from the heads 92 of the queues 42, the descriptor mover 120 performs less linked list operations than in conventional approaches which remove descriptors from the middles of queues, i.e., conventional approaches which must atomically unlink entries from the middles of LRU queues during critical code paths. In particular, the removal of a descriptor 40 from a queue head 92 simply requires accessing the descriptor 40 to be moved, and the adjacent descriptor 40 in the reverse direction (e.g., based on the reverse pointer). There is no adjacent descriptor 40 in the forward direction at the head 92 thus alleviating the need to read the forward pointer and update any adjacent forward descriptor 40. The reduction in overhead (i.e., the savings in linked list operations due to removing descriptors 40 from the queue heads 92 rather than middles) reduces overhead and the chances of forming resource bottlenecks which are typical deficiencies of conventional descriptor management approaches.

Operation

Figure 5:
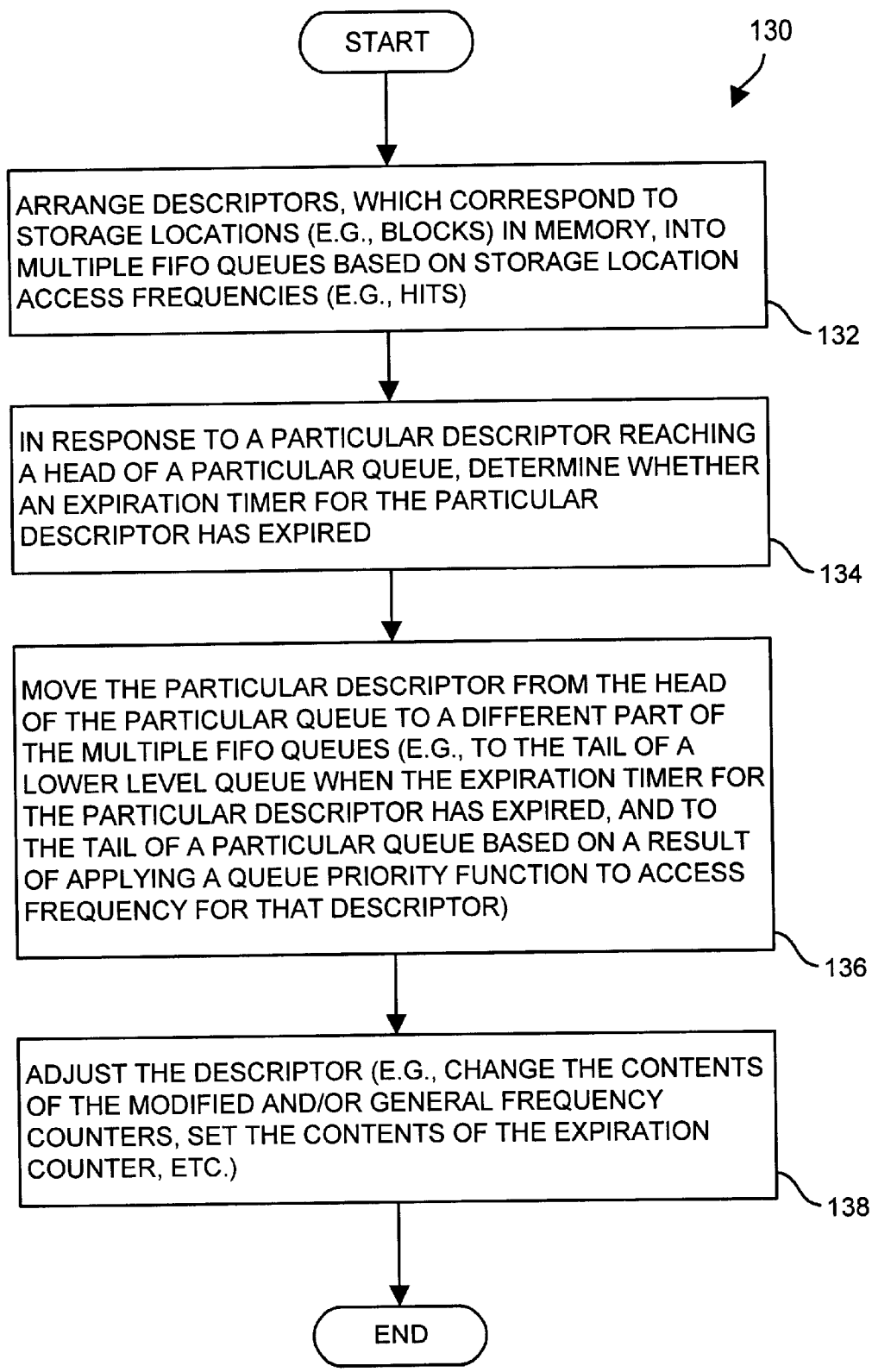
FIG. 5 shows a flowchart of a procedure which is performed by the computerized system of FIG. 4.

FIG. 5 shows a flowchart of a procedure 130 summarizing the operation of the computerized system 100 of FIG. 4. In step 132, the control circuit 102 arranges descriptors 40, which correspond to storage locations 72 in the cache memory 104, into multiple FIFO queues 42 based on storage location access frequencies $C_F$. By way of example, the control circuit 102 arranges the descriptors 40 into four FIFO queues 42 as shown in FIG. 3.

In step 134, in response to a particular descriptor reaching the head 92 of a particular queue 42, the control circuit 102 determines whether an expiration timer for the particular descriptor 40 has expired. In particular, the descriptor mover 120 compares the contents of the expiration counter field 60 of that descriptor 40 to the current contents of the global counter 96. If the current contents of the global counter 96 exceed the contents of the expiration counter field 60, which were earlier set to the sum of the earlier contents of the global counter 96 plus a lifetime constant in response to the most recent cache hit, the expiration timer for that descriptor 40 has expired. Otherwise, the expiration timer has not expired.

In step 136, the control circuit 102 moves the particular descriptor 40 from the head 92 of the particular queue 42 to a different part of the multiple queues 42. In particular, if the expiration timer for that descriptor 40 has expired, the control circuit 102 moves the descriptor 40 to the tail of the next lower FIFO queue 42 in an automated manner. If the expiration timer has not expired, the control circuit 102 performs the queue priority function on the access frequency for that descriptor 40, and moves the descriptor 40 to the tail 94 of a FIFO queue 42 based on the result of the queue priority function.

In step 138, the control circuit 102 adjusts the descriptor 40. For example, the control circuit 102 updates contents within the fields of the descriptor 40 such as the contents of the general frequency counter field 56, the expiration counter field 60 and the current queue field 62 when moving the descriptor 40 from the head 92 of the current queue 42 to a queue tail 94. Since the control circuit 102 removes the descriptor 40 from the queue head 92 rather than from the middle of the queue 42, there are less linked list operations than in conventional approaches which remove descriptors from the middles of LRU queues in response to cache accesses. In particular, there is no need to modify three descriptors as in conventional descriptor management approaches since the invention involves moving descriptors 40 from the heads 92 of the queues 42. Accordingly, the invention has lower overhead than such conventional approaches.

As described above, the invention is directed to techniques for managing storage location descriptors 40 which involve moving the descriptors 40 from the heads 92 of multiple FIFO queues 42 based on access frequency and whether expiration timers have expired. Such operation provides approximate LRU functionality while (i) alleviating the need for moving the descriptors from the middles of LRU queues as in conventional descriptor management approaches, and (ii) avoiding resource bottlenecking deficiencies associated with moving descriptors from the middle of LRU queues (i.e., fewer unlinking and linking operations in the critical path). Accordingly, the techniques of the invention provide for a more efficient implementation of resource maintenance operations.

While this invention has been particularly shown and described with references to preferred embodiments thereof, it will be understood by those skilled in the art that various changes in form and details may be made therein without departing from the spirit and scope of the invention as defined by the appended claims.

For example, as shown in FIG. 2, some arrangements of the invention utilize a modified frequency counter field 58. That is, each descriptor 40 includes such a modified frequency counter field 58 in addition to the general frequency counter field 56. Unlike the contents $C_F$ of the general frequency counter field 56, the contents $C_{MF}$ of the modified frequency counter field 58 indicate a relative or recent frequency count as will now be explained in further detail.

In the arrangements that use the modified frequency counter field 58, the hit/miss handler 114 updates the contents $C_{MF}$ of the modified frequency counter field 58 whenever it modifies the contents $C_F$ of the general frequency counter field 56. That is, the hit/miss handler 114 mirrors the changes of the fields 56, 58. Accordingly, if the hit/miss handler 114 increments the contents $C_F$ of the general frequency counter field 56, the hit/miss handler 114 increments the contents $C_{MF}$ of the modified frequency counter field 58.

Additionally, in the arrangements that use the modified frequency counter field 58, the descriptor mover 120 is capable of moving descriptors 40 not only to lower level queues 42, but also to higher level queues 42 as well. In particular, when the expiration timer of a descriptor 40 at the head 92 of a queue 42 has not expired, the descriptor mover 120 (i) performs a queue priority function operation on the contents $C_{MF}$ of the modified frequency counter field 58 of that descriptor 40 (e.g., log2($C_{MF}$)) which can increase in response to cache accesses while the descriptor 40 moves through the queue 42, and (ii) moves the descriptor 40 to a queue 42 based on the result of the queue priority function operation.

If the descriptor mover 120 moves the descriptor 40 to a higher queue 42, the descriptor mover 120 subtracts the queue priority function from the contents of the modified frequency counter field 58 essentially resetting or zeroing out the contents of the modified frequency counter field 58 by the result of 2 to the power of the queue priority function, for example. As such, the contents of the modified frequency counter field 58 provide an indication of access frequency appropriate for the duration of time while the descriptor 40 resides in the current queue 42. If there were a high number of cache hits on the storage location identified by that descriptor 40 while the descriptor 40 resides in the current queue 42 (e.g., if the number of cache hits increases by at least a power of 2), the result of the queue priority function would likely indicate that the descriptor 40 should be moved to the tail 94 of a higher level queue 42. In cases of severe changes in the cache access frequency it is possible for a descriptor 40 to migrate up or down by multiple queue levels by crossing multiple powers of 2.

In contrast, when the descriptor mover 120 moves the descriptor 40 to the tail 94 of the next lower queue 42 (or the tail 94 of the same queue 42), the descriptor mover 120 preserves the contents of the modified frequency counter field 58 of that descriptor 40.

In the arrangements which use the modified frequency counter field 58, the descriptor mover 120 updates the contents of the current queue field 62 of descriptors 40 when moving the descriptors 40 to higher or lower level queues 42.

Furthermore, it should be understood that the FIFO queues 42 do not need to be populated. Rather, the number of descriptors 40 in each queue 42 can be solely based on the results of the queue priority function. Accordingly, some queues 42 can be empty. As a result, the descriptor evictor 116 pulls candidates for the free descriptor queue 82 from the head 92 of the lowest level queue 42, e.g., from the head 92-0 of the queue 42-0 when that queue 42-0 has descriptors 40, from the head 92-1 of the queue 42-1 when that queue 42-1 has descriptors 40 but the queue 42-0 is empty, and so on.

Additionally, it should be understood that the particular data storage system configuration 20 of FIG. 1 was provided by way of example only. Other configurations are suitable for use by the invention as well. For example, the data storage system configuration 20 can support multiple hosts 26 rather than a single host as shown in FIG. 1. Moreover, the descriptor management techniques performed by the control circuit 32 of the front-end device 22 can be performed by other devices as well such as the data storage assembly control circuit 28 of the data storage assembly 22 in order to minimize overhead of the data storage assembly 22. The techniques are also well suited for standalone configurations such as those of standalone data storage systems, general purpose computers, and the like. In particular, the techniques are suitable for any application which works with approximate LRU functionality (e.g., in database or other high-level applications at a pure software level rather than at a lower level).

Furthermore, it should be understood that the format 50 of the descriptor 40 in FIG. 2 was provided by way of example only. In other arrangements, the fields are in different orders and/or some fields are added or omitted. For example, the forward and reverse pointer fields 64, 66 are included so that the descriptors 40 themselves operate as entries to doubly-linked lists. In other arrangements, a corresponding set of doubly-linked list entries corresponds with but are not part of the descriptors themselves.

Additionally, it should be understood that the arrangement 80 of FIG. 3 showed four queues 42 by way of example only. Other arrangements use different numbers of queues 42 (e.g., two, three, five, more than five, etc.). In some arrangements, the queue priority function is a formula other than $\log_2()$ which, in some instances, affects the number of queues 42. For example, the function can simply be dictated ranges of cache hits (e.g., 1 to 2 cache hits for a first queue, 3 to 5 cache hits for a second queue, 6 to 10 cache hits for a third queue, and so on).

Furthermore, it should be understood that the control circuit 102 of the computerized system 100 was described above as being a processor running an application by way of example only. In other arrangements, the control circuit 102 includes other control mechanisms such as application specific integrated circuits (ASICs), field programmable gate array devices, etc.

Additionally, it should be understood that the global counter 96 (FIG. 3) was describe by way of example only. In these arrangements, circuitry and/or calculations make adjustments to the contents of the expiration counter field 60 to account for the global counter 96 wrapping around when it reaches its limit. In other arrangements, there is no global counter 96. Rather, the contents of the expiration counter field 60 of each descriptor 40 is set to the length of the current queue (or alternatively a constant) and the value logically decrements each time the descriptor 40 moves closer to the head 92. As a result, there is no need for a global counter 96 and associated difficulties in correctly for wrap-around.

In one arrangement, the descriptor format 50 (see FIG. 2) further includes a current queue length field which stores the current queue length of the current queue 42, and the expiration counter field 60 stores a lifetime constant. When the descriptors 40 reach the queue heads 92, the descriptor mover 120 subtracts the contents of the current queue length field (i.e., the current queue length) from the contents of the expiration counter field 60 and places the result as the new contents in the expiration counter field 60. If the result is greater than zero, the expiration timer for that descriptor 40 has not expired and the descriptor mover 120 moves the descriptor 40 to the tail of a queue 42 based on the results of applying the queue priority function to the access frequency for that descriptor 40 as described earlier. However, if the result is less than or equal to zero, the descriptor mover 120 moves the descriptor 40 to the tail 94 of the adjacent lower level queue 42, i.e., automatically demotes that descriptor 40. Accordingly, the invention can utilize timers while avoiding the drawback of a global counter which periodically loops (i.e., rolls over).

Furthermore, it should be understood that the invention was described above as being suitable for handling descriptors 40 (or other types of entries) using linked list data structures by way of example only. The invention can also be applied to other mechanisms such as stacks, logical first-in/first-out queues and hardware queues (e.g., FIFO queues implemented in hardware). The techniques of the invention provide the capability to implement approximate LRU operation to such mechanisms.

What is claimed is:

1. A computerized system, comprising:
  a cache having storage locations;
  an interconnection mechanism; and
  a controller, coupled to the cache through the interconnection mechanism, to manage descriptors which correspond to the storage locations of the cache, wherein the controller is configured to:
    arrange the descriptors, which correspond to the storage locations of the cache, into multiple queues based on storage location access frequencies;
    in response to a particular descriptor reaching a head of a particular queue, determine whether an expiration timer for the particular descriptor has expired; and
    move the particular descriptor from the head of the particular queue to a different part of the multiple queues, wherein the different part is identified based on access frequency when the expiration timer for the particular descriptor has not expired, and not based on access frequency when the expiration timer for the particular descriptor has expired.

2. The system of claim 1 wherein the controller is configured to manipulate each of the multiple queues as a first-in/first-out queue.

3. A device for managing descriptors which correspond to storage locations, the device comprising:
  memory; and
  a control circuit coupled to the memory, the control circuit being configured to:
    arrange the descriptors, which correspond to the storage locations, into multiple queues within the memory based on storage location access frequencies;
    in response to a particular descriptor reaching a head of a particular queue, determine whether an expiration timer for the particular descriptor has expired; and
    move the particular descriptor from the head of the particular queue to a different part of the multiple queues, wherein the different part is identified based on access frequency when the expiration timer for the particular descriptor has not expired, and not based on access frequency when the expiration timer for the particular descriptor has expired.

4. The device of claim 3 wherein each descriptor includes a respective modified frequency counter field, and wherein the control circuit is further configured to:
  when moving the particular descriptor from the head of the particular queue to a queue of the multiple queues that is at a higher level than the particular queue, modify contents of the modified frequency counter field of the particular descriptor; and
  when moving the particular descriptor from the head of the particular queue to a queue of the multiple queues that is not at a higher level than the particular queue, preserve the contents of the modified frequency counter field of the particular descriptor.

5. The device of claim 4 wherein each descriptor further includes a respective general frequency counter field, wherein the particular descriptor corresponds to a particular storage location, and wherein the control circuit is further configured to:
  in response to accessing the particular storage location, update the contents of the general frequency counter field and the contents of the modified frequency counter field.

6. The device of claim 3 wherein each descriptor includes a respective modified frequency counter field, and wherein the control circuit is configured to:
  when moving the particular descriptor from the head of the particular queue to a different part of the multiple queues, perform a queue priority function on contents of the modified frequency counter field of the particular descriptor to generate a queue priority function result, and position the particular descriptor at a tail of one of the multiple queues based on the queue priority function result.

7. The device of claim 6 wherein the control circuit, when performing and positioning, is configured to:
  place the particular descriptor at a tail of a queue that is at least two levels higher than the particular queue when the queue priority function result identifies the queue that is at least two levels higher than the particular queue.

8. The device of claim 3 wherein each descriptor includes a respective modified frequency counter field, and wherein the control circuit is further configured to:
  in response to a miss operation for data previously stored in the storage locations, initialize contents of the modified frequency counter field of a new descriptor of a free descriptor queue, and move the new descriptor from the free descriptor queue to a tail of one of the multiple queues.

9. The device of claim 3 wherein the control circuit is further configured to:
  when moving the particular descriptor from the head of the particular queue to a tail of one of the multiple queues, set contents of the expiration timer of the particular descriptor to an amount substantially equal to contents of a global counter plus a lifetime constant.

10. The device of claim 3 wherein the control circuit is further configured to:
  when moving the particular descriptor from the head of the particular queue to a tail of one of the multiple queues, set contents of the expiration timer of the particular descriptor to an amount substantially equal to a lifetime constant, and sets contents of a queue length field of the particular descriptor to identify a current queue length of the one of the multiple queues.

11. The device of claim 3 wherein the control circuit is configured to manipulate each of the multiple queues as a first-in/first-out queue.

12. In a computerized device, a method for managing descriptors which correspond to storage locations in the memory, the method comprising the steps of:

arranging the descriptors, which correspond to the storage locations in the memory, into multiple queues based on storage location access frequencies;

in response to a particular descriptor reaching a head of a particular queue, determining whether an expiration timer for the particular descriptor has expired; and moving the particular descriptor from the head of the particular queue to a different part of the multiple queues, wherein the different part is identified based on access frequency when the expiration timer for the particular descriptor has not expired, and not based on access frequency when the expiration timer for the particular descriptor has expired.

13. The method of claim 12 wherein each descriptor includes a respective modified frequency counter field, and wherein the method further comprises the step of:

when moving the particular descriptor from the head of the particular queue to a queue of the multiple queues that is at a higher level than the particular queue, modifying contents of the modified frequency counter field of the particular descriptor; and when moving the particular descriptor from the head of the particular queue to a queue of the multiple queues that is not at a higher level than the particular queue, preserving the contents of the modified frequency counter field of the particular descriptor.

14. The method of claim 13 wherein each descriptor further includes a respective general frequency counter field, wherein the particular descriptor corresponds to a particular storage location in the memory, and wherein the method further comprises the step of:

in response to accessing the particular storage location in the memory, updating the contents of the general frequency counter field and the contents of the modified frequency counter field.

15. The method of claim 12 wherein each descriptor includes a respective modified frequency counter field, and wherein the step of moving and leaving includes the step of:

when moving the particular descriptor from the head of the particular queue to a different part of the multiple queues, performing a queue priority function on contents of the modified frequency counter field of the particular descriptor to generate a queue priority function result, and positioning the particular descriptor at a tail of one of the multiple queues based on the queue priority function result.

16. The method of claim 15 wherein the step of performing and positioning includes the step of:

placing the particular descriptor at a tail of a queue that is at least two levels higher than the particular queue when the queue priority function result identifies the queue that is at least two levels higher than the particular queue.

17. The method of claim 12 wherein each descriptor includes a respective modified frequency counter field, and wherein the method further comprises the step of:

in response to a miss operation for data previously stored in the memory, initializing contents of the modified frequency counter field of a new descriptor of a free descriptor queue, and moving the new descriptor from the free descriptor queue to a tail of one of the multiple queues.

18. The method of claim 12 wherein the method further comprises the step of:

when moving the particular descriptor from the head of the particular queue to a tail of one of the multiple queues, setting contents of the expiration timer of the particular descriptor to an amount substantially equal to contents of a global counter plus a lifetime constant.

19. The method of claim 12 wherein the method further comprises the step of:

when moving the particular descriptor from the head of the particular queue to a tail of one of the multiple queues, setting contents of the expiration timer of the particular descriptor to an amount substantially equal to a lifetime constant, and seting contents of a queue length field of the particular descriptor to identify a current queue length of the one of the multiple queues.

20. A computer program product having instructions stored thereon for managing descriptors which correspond to storage locations in memory, such that the instructions, when carried out by a computer, cause the computer to perform the steps of:

arranging the descriptors, which correspond to the storage locations in the memory, into multiple queues based on storage location access frequencies;

in response to a particular descriptor reaching a head of a particular queue, determining whether an expiration timer for the particular descriptor has expired; and moving the particular descriptor from the head of the particular queue to a different part of the multiple queues, wherein the different part is identified based on access frequency when the expiration timer for the particular descriptor has not expired, and not based on access frequency when the expiration timer for the particular descriptor has expired.

* * * * *